H. SCHMIDT.
APPARATUS FOR GRINDING LENSES.
APPLICATION FILED JULY 16, 1909.
968,698.
Patented Aug. 30, 1910.
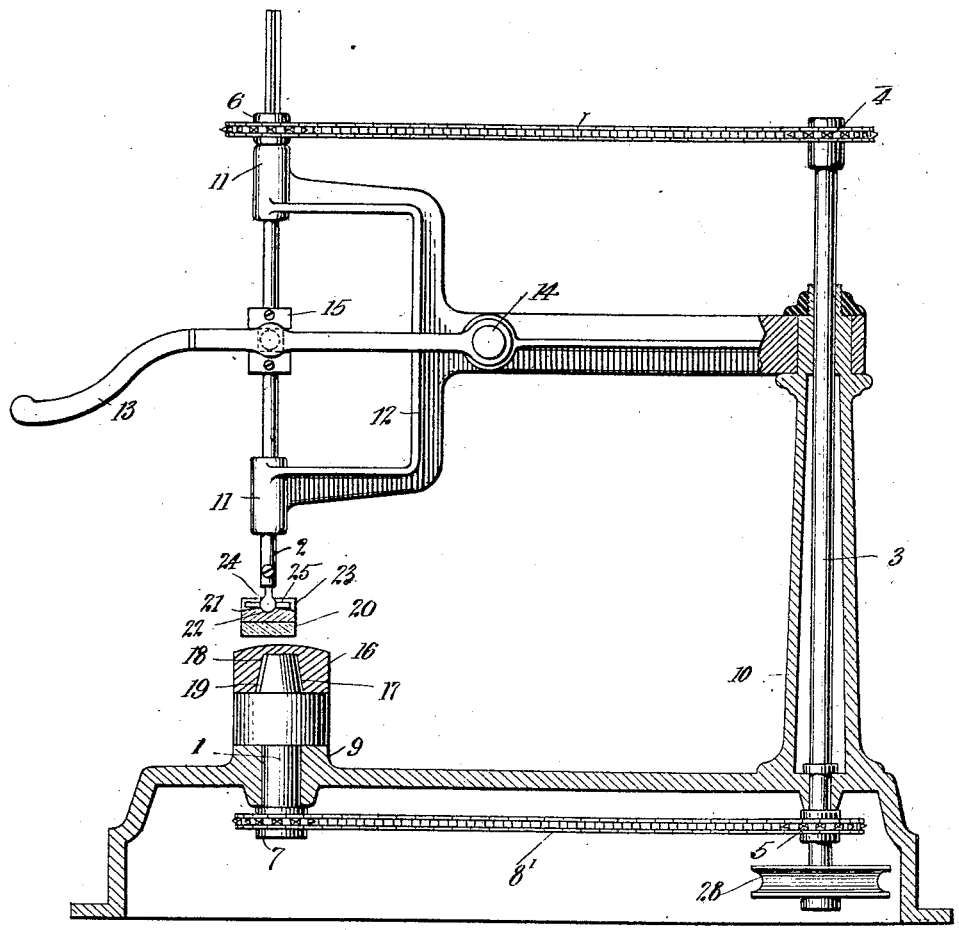

UNITED STATES PATENT OFFICE.

HENRY SCHMIDT, OF UNIONPORT, NEW YORK, ASSIGNOR TO THE MEYROWITZ MANUFACTURING COMPANY, A CORPORATION OF NEW JERSEY.

APPARATUS FOR GRINDING LENSES.

968,698.  Specification of Letters Patent.  Patented Aug. 30, 1910.

Application filed July 16, 1909.  Serial No. 507,902.

*To all whom it may concern:*

Be it known that I, HENRY SCHMIDT, a citizen of the United States, residing at Unionport, in the county of Westchester and State of New York, have invented certain new and useful Improvements in Apparatus for Grinding Lenses, of which the following is a full, clear, and exact description.

My invention relates to apparatus for grinding lenses.

The grinding of toric lenses has hitherto been accomplished in most cases by reciprocating a tool with a toric surface in a rectilinear path and reciprocating the lens blank in another rectilinear path at right-angles to the first. This evidently fulfils the necessary requisite in this class of work, namely continuing absolute parallelism between a given diameter or transverse axis of the work and a corresponding fixed diameter or axis of the tool. Attempts have been made to obtain a rotating mechanism somewhat analogous to that employed for spherical lenses. This would have the advantage of avoiding reciprocating and other vibrating parts, the to and fro movement of which is not only injurious to the machinery, but is detrimental to the accuracy of the grinding process. Among other machines may be mentioned one in which the work and tool are both rotated at the same speed and given a relative lateral movement. The defect which has hitherto prevented entire success of these machines, has been the fact that the relative lateral movement between the work and the tool produced a slight variation from the exact parallelism conditions above referred to, and which it is of course absolutely necessary to attain.

It is the purpose of my invention to provide a machine operating rigorously and precisely in this latter way, and I regard the process in the performance of which the machine operates as novel for the reason that it has not been actually attained so far as I am aware in any prior mechanism.

The drawing shows in side elevation partly in section, a lens grinding machine embodying the principles of my invention.

Referring to the drawings, 1 designates a tool carrying spindle and 2 a lens blank or work carrying spindle. The latter spindle is permanently out of alinement with the former even in its central positions, and is adapted to be swung to positions still more out of alinement in its operation, as later described.

Referring to the drawings 3 denotes a vertical driving shaft with sprocket wheels 4 and 5 preferably of equal size and driving identical sprockets 6 and 7 on the work spindle 2 and the tool spindle 1 respectively through the chains 8 and 8'. The wheel 6 is splined to the work spindle 2. The tool spindle rotates in a fixed bearing 9 forming part of the frame of the machine, the latter also having a standard or stanchion 10 or its equivalent in which the driving shaft 3 is journaled. The work spindle 2 revolves in bearing 11 of an arm or bracket 12 pivoted to the frame of the machine and preferably sleeved to the standard or stanchion 10 concentrically with the shaft 3. The work spindle 2 is capable of a vertical or up and down movement in its containing bracket and I provide a handle 13 pivoted to the bracket at 14 and coupled to a grooved collar 15 on the spindle 2, so as to elevate and depress said spindle in its bearings. This handle is by its nature fixed against any sidewise movement independent of the bracket and is therefore conveniently adapted to swing the bracket to and fro from side to side at the same time that it is employed to depress the spindle, thereby bearing the work against the tool. The tool, denoted 16, is of the ordinary sort and is fixed to the spindle 1 in any suitable manner. I prefer to make the tool with a taper socket 17 having a groove or keyway 18. In this case the spindle 1 will be correspondingly tapered and have a key or spline 19 at one side. This secures the tool on the spindle in a fixed angular relation.

The work denoted 20 comprises the usual base block 21 with a spherical socket 22 and a transverse groove 23 adapted to be received on a ball 24 of the spindle 2, this ball having a transverse pin 25 entering said groove and thereby providing for a universal movement in a fixed diametral plane of the spindle. The lens blank or blanks are cemented or otherwise secured to the holder 21.

The use and operation is as follows: The shaft 3 being rotated from any suitable power connection such as the pulley 28, transmits its motion to the tool spindle 1 and to the work spindle 2, driving these spindles at the same speeds and in the same direction. The operator presses downward on the handle 13, oscillating it from side to side at the same time so as to move the lens blank over the surface of the rotating tool. The lens blank is, of course, rotated at the same time, but being on an axis eccentric to the axis of rotation of the tool, describes a rapid and varied relative movement on the tool which is particularly varied when the positions of the work and tool spindles are altered during the action as described. As long as the axes of the two spindles are in the same relative positions, there will evidently be no change in the parallelism of given predetermined transverse planes in the work and the tool respectively, on account of the positive and equal drive of spindles 1 and 2 from the same moving shaft. It will further be observed that the character of the chain drive employed does not disturb this condition of parallelism even when the work spindle is moved from side to side. This is because the chain runs open or straight and not crossed, and between sprocket wheels of the same size, whereby it acts to maintain the parallelism referred to. The chain drive is therefore particularly advantageous. However, I do not desire to be strictly limited or restricted to the chain drive, as other positive drives adapted to give equal speeds may be employed, and still secure the rigorously exact parallelism conditions which are of course essential as above pointed out. It is also evident that making the side to side movement occur distinctively in the work spindle is unimportant since only a relative lateral movement between the spindles is requisite which may be obtained by moving either one, and even this is not absolutely essential. The dominant fact is that the work and tool spindles are pressed together with a continuous and widely varying rapid motion, but a given transverse diameter of the tool is always kept parallel with a given transverse diameter of the work. The machine is therefore adapted for cylindrical and toric lenses although spherical grinding may also be done. It is better however to disconnect the driving connection of the work spindle in the latter case.

What I claim, is:—

1. In a lens grinding machine, a rotating grinding tool, a spindle rotating at the same speed permanently eccentric to the axis of the grinding tool, a blank holder flexibly connected to said spindle in a fixed diametral plane thereof, and means for swinging said spindle from side to side and depressing it on the grinding tool.

2. In a lens grinding machine, a grinding tool, a spindle permanently eccentric to the axis thereof, a blank holder flexibly connected to said spindle in a fixed diametral plane thereof, means for rotating said grinding tool and spindle at the same speeds and in the same directions, and means for swinging said spindle from side to side and depressing it on the grinding tool.

3. In a lens grinding machine, a grinding tool, a spindle eccentric to the axis of the grinding tool, a blank holder flexibly connected to said spindle in a fixed diametral plane thereof, and a pair of open driving sprocket chains or connections for rotating said tool and said spindle at the same speeds and in the same directions.

4. In a lens grinding machine, a grinding tool, a spindle eccentric to the axis of the grinding tool, a blank holder flexibly connected to said spindle in a fixed diametral plane thereof, a pair of open driving sprocket chains or connections for rotating said tool and said spindle at the same speeds and in the same directions, and means for swinging said spindle from side to side and depressing it on a grinding tool.

5. In a lens grinding machine, a rotating grinding tool, a spindle rotating at the same speed as the said tool, a blank holder connected to the said spindle and rotating by reason of its connection therewith, at the same speed as said grinding tool, the axis of said blank holder being eccentrically disposed in predetermined position with respect to the axis of said tool, and means for changing the relative positions of said tool and blank holder, the combination of the above recited parts so operating that given diametral lines of the work held by said blank holder shall be maintained in substantial parallelism with corresponding diametral lines of the tool.

In witness whereof, I subscribe my signature, in the presence of two witnesses.

HENRY SCHMIDT.

Witnesses:
WALDO M. CHAPIN,
JAMES DE ANTONIO.